May 17, 1927.
L. WERNICKE
AIR MOTOR
Filed Aug. 24, 1925
1,628,867
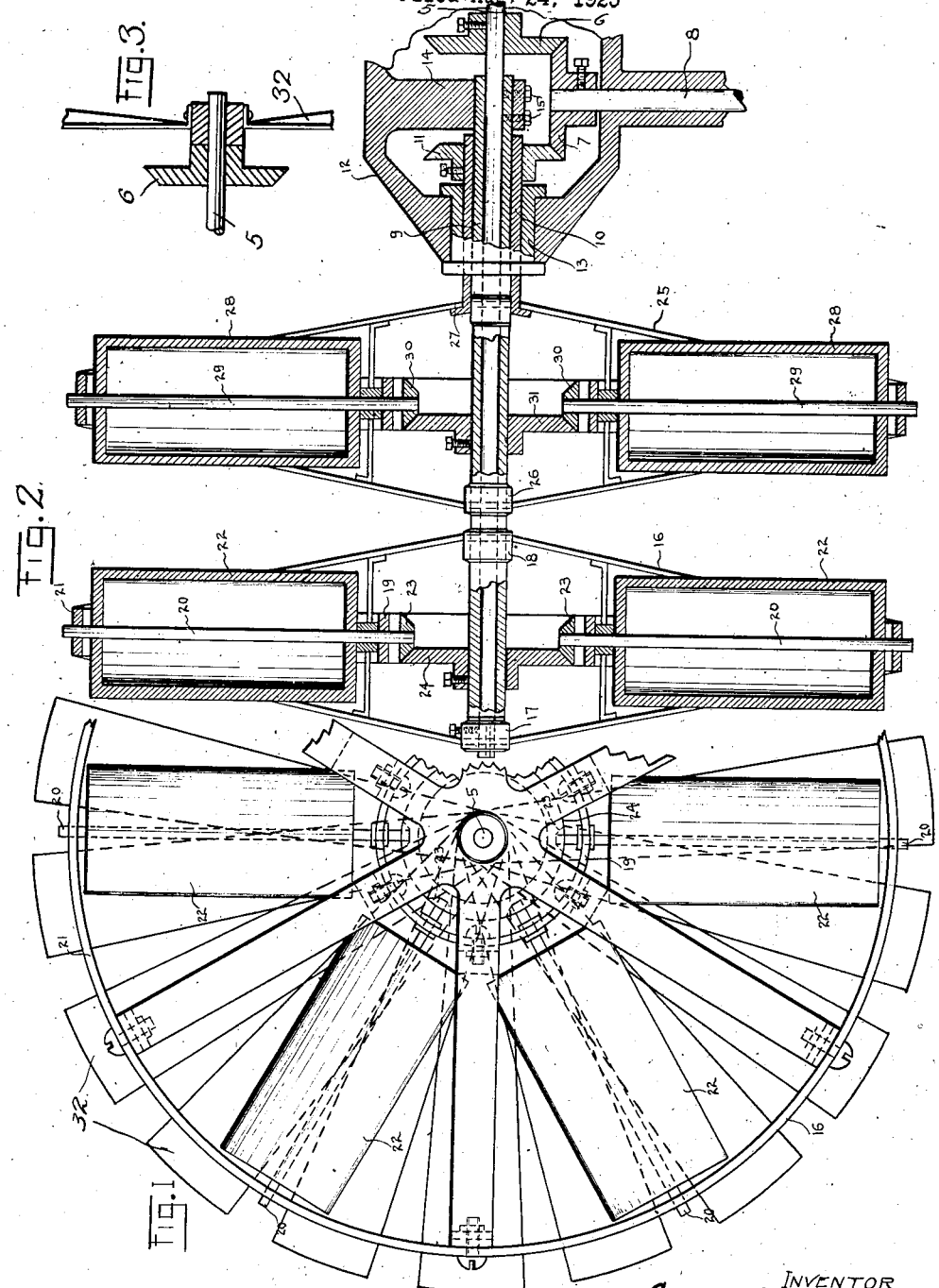
INVENTOR
BY Louis Wernicke
Morsell, Keeney & Morsell
ATTORNEYS Patented May 17, 1927.

1,628,867

UNITED STATES PATENT OFFICE.

LOUIS WERNICKE, OF WEST BEND, WISCONSIN.

AIR MOTOR.

Application filed August 24, 1925. Serial No. 52,029.

This invention relates to improvements in air motors.

It is one of the objects of the present invention to provide an air motor adapted for use with an ordinary windmill to increase the power developed thereby.

A further object of the invention is to provide an air motor which utilizes a natural phenomena known as the "Magnus law."

A further object of the invention is the provision of an air motor which is adapted to be mounted or coupled with the power shaft of a wind mill to receive its initial impulse therefrom and arranged to multiply the power developed by the windmill.

A further object of the invention is to provide an air motor of the class described which is of very simple construction, is inexpensive to manufacture, is strong and durable, and is well adapted for the purposes described.

With the above and other objects in view the invention consists of the improved air motor, and its parts and combinations as set forth in the claims, and all equivalents thereof.

In the accompanying drawing in which the same reference characters indicate the same parts in both of the views:

Fig. 1 is a front view of the improved air motor;

Fig. 2 is a sectional view thereof; and

Fig. 3 is a view similar to Fig. 1, showing a continuation thereof.

Referring now more particularly to the drawing it will be seen that the numeral 5 indicates a shaft which is adapted to carry at one end a regulation wind mill 32. The medial portion of the shaft has secured thereto a miter gear 6 arranged to mesh with a miter gear 7 secured to a power shaft 8 at right angles to the shaft 5. An elongated sleeve 9 encloses the shaft 5 and revolubly mounted about the sleeve 9 is a short outer sleeve 10 having secured thereto a miter gear 11 arranged to mesh with the miter gear 7.

A housing 12 encloses the medial portion of the shaft 5, portions of the sleeves 9 and 10 and the miter gears 6, 7 and 11 and the end portion of the housing is provided with a bushing 13 to permit the free rotation of the sleeve 10. A depending support 14 of the split formation and adjustable by means of bolts 15, engages the free end portion of the sleeve 9 to support the same and hold it rigid against movement.

An outer auxiliary wheel 16 having hub portions 17 and 18 is mounted on the shaft 5 and sleeve 9, the hub 17 being keyed to the end portion of the shaft 5 whereby the wheel is rotated by said shaft and the hub portion 18 is loosely mounted on the rigid sleeve 9 to turn thereon. The wheel 16 is provided with an inner annular band 19 from which radiate a plurality of revoluble rods 20, the outer end portions of said rods being mounted in an outer annular rim 21.

Each of the rods 20 carries a cylinder 22. To rotate its rod, the lower end portions of the rods carry small bevel gears 23 arranged to ride around the surface of a large bevel gear 24 keyed to the rigid sleeve 9, the ratio between the gear 24 and the smaller gears 23 being approximately four to one in order that the cylinders will rotate faster than the speed of rotation of the wheel.

A second auxiliary wheel 25, similar to the wheel 16 is positioned thereadjacent and is formed with a hub portion 26 loosely mounted on the rigid sleeve 9. The opposite portion of the wheel 25 is secured as at 27, to the outer sleeve 10 which is freely revoluble on the sleeve 9. Thus it will be seen that through the gears 6, 7 and 11 and the connection between the wheel 25 and the sleeve 10, rotation is imparted to the wheel 25 in a direction opposite to the direction of rotation of the wheel 16.

Cylinders 28 carried by radial rods 29 formed with miter gears 30, turn on and about a larger gear 31.

The improved air motor utilizes a natural phenomena known as the "Magnus law". The effect of wind striking the revolving cylinders is an increase of pressure with a decrease of wind velocity, on the side on which the wind strikes, and a decrease of pressure with an increase of velocity of the opposite side. By the application of the "Magnus law", the area of decreased pressure and increased velocity will at certain cylinder speed extend approximately three-fourths of the way around the cylinders. It has been found that this effect is attained when the cylinders are revolved at four times the wind velocity, and the developed pressure will then be about fifteen times greater than ordinarily.

In practice, the shaft 5 receives its initial impulse from an ordinary wind mill and the wheel 16 and cylinders 22 are revolved by the shaft 5. The wheel 25 and its cylinders 28 are revolved in opposite directions by the sleeve 10 and by means of the Magnus effect attained through the revolving of the cylinders the power developed by the wind mill is multiplied and is translated to the work shaft 8.

From the foregoing description it will be seen that the improved air motor is of very simple and novel construction, and is well adapted for the purpose set forth.

What I claim as my invention is:

1. A device of the character described, comprising a revoluble main shaft, a rigid sleeve surrounding the same, a revoluble sleeve surrounding a portion of the rigid sleeve, a wheel carried by said shaft, a wheel carried by said revoluble sleeve, means carried by said main shaft for revolving said wheels in opposite directions, a plurality of cylinders rotatably mounted in each wheel, means in connection with said rigid sleeve for rotating the cylinders of the wheels, a second shaft, and means for transmitting motion from the main shaft and said revoluble sleeve to said second shaft.

2. A device of the character described, comprising a revoluble main shaft carrying a miter gear, a windmill secured at one end of said shaft to furnish initial impulse thereto, a rigid sleeve about said shaft, a revoluble sleeve surrounding the main shaft and rigid sleeve and carrying a miter gear, a wheel carried by said shaft, a wheel carried by said revoluble sleeve, a plurality of cylinders rotatably mounted in each wheel, gear connections between the rigid sleeve and the cylinders of the wheels for rotating said cylinders when the wheels are turned, a second shaft at right angles to the main shaft, and a miter gear carried thereby in mesh with both of said first-mentioned miter gears.

In testimony whereof I affix my signature.

LOUIS WERNICKE.